US011177676B2

(12) United States Patent
Liu et al.

(10) Patent No.: US 11,177,676 B2
(45) Date of Patent: Nov. 16, 2021

(54) SYSTEMS AND METHODS FOR FAST CHARGING BATTERIES USING INTERMITTENT DISCHARGE PULSES (71) Applicant: FORD GLOBAL TECHNOLOGIES, LLC, Dearborn, MI (US)

(72) Inventors: Minghong Liu, Taylor, MI (US); Kent Snyder, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 163 days.

(21) Appl. No.: 16/451,465

(22) Filed: Jun. 25, 2019

(65) Prior Publication Data

US 2020/0406766 A1  Dec. 31, 2020

(51) Int. Cl.
*H02J 7/00* (2006.01)
*B60L 53/14* (2019.01)
*B60L 58/15* (2019.01)
*B60L 53/62* (2019.01)
*B60L 53/30* (2019.01)
*B60L 58/24* (2019.01)

(52) U.S. Cl.
CPC .............. *H02J 7/007* (2013.01); *B60L 53/14* (2019.02); *H02J 7/00711* (2020.01); *B60L 53/305* (2019.02); *B60L 53/62* (2019.02); *B60L 58/15* (2019.02); *B60L 58/24* (2019.02)

(58) Field of Classification Search
CPC ........ B60L 53/14; B60L 53/62; B60L 53/305; B60L 58/15; B60L 58/24; H02J 7/007; H02J 7/00711
USPC .......................... 320/129, 130, 133, 134, 136
See application file for complete search history.

(56) References Cited

U.S. PATENT DOCUMENTS 4,385,269 A   5/1983  Aspinwall et al.
5,561,360 A  10/1996  Ayres et al.
(Continued)

FOREIGN PATENT DOCUMENTS

CN        102810700 A     12/2012

OTHER PUBLICATIONS

Aryanfar, et al., Dynamics of Lithium Dendrite Growth and Inhibition: Pulse Charging Experiments and Monte Carlo Calculations, The Journal of Physical Chemistry Letters, dx.doi.org/10.1021/jz500207a | J. Phys. Chem. Lett. 2014, 5, 1721-1726.
(Continued)

*Primary Examiner* — Edward Tso
*Assistant Examiner* — Aaron Piggush
(74) *Attorney, Agent, or Firm* — David B. Kelley; Carlson, Gaskey & Olds (57) ABSTRACT This disclosure describes exemplary charging systems and methods for fast charging energy storage devices (e.g., battery cells of battery packs). An exemplary charging system may be configured to control charging of a charging circuit by employing repetitive intermittent discharge pulses. The control system may be configured to command the charging circuit to apply a discharge pulse current to the battery cell for a first time period, apply a charging current to the battery cell for a second time period that is significantly longer than the first time period, and then repetitively alternate between applying the discharge pulse current and the charging current until the battery cell reaches a predefined maximum voltage.

20 Claims, 8 Drawing Sheets

(56) References Cited

U.S. PATENT DOCUMENTS

| | | | |
|---|---|---|---|
| 5,808,447 A | 9/1998 | Hagino | |
| 5,998,968 A * | 12/1999 | Pittman | H02J 7/00711 320/130 |
| 8,638,070 B2 | 1/2014 | Maluf et al. | |
| 9,793,736 B2 | 10/2017 | Luo et al. | |
| 2005/0225299 A1* | 10/2005 | Petrovic | H02J 7/0071 320/141 |
| 2016/0204625 A1* | 7/2016 | Josephs | H02J 7/0021 320/139 |
| 2017/0187207 A1* | 6/2017 | Li | H02J 7/0031 |

OTHER PUBLICATIONS

Purushothaman, et al., Reducing Mass-Transport Limitations by Application of Special Pulsed Current Modes, Journal of The Electrochemical Society, 152 (4) J33-J39 (2005); 0013-4651/2005/152~4!/J33/7/$7.00 © The Electrochemical Society, Inc.

Purushothaman, et al., Rapid Charging of Lithium-Ion Batteries Using Pulsed Currents, Journal of The Electrochemical Society, 153 (3) A533-A542 (2006), 0013-4651/2006/153(3)/A533/10/$20.00 © The Electrochemical Society.

Pia, et al., Intercalation of Lithium Ions into Graphite Electrodes Studied by AC Impedance Measurements, Journal of The Electrochemical Society, 146 (8) 2794-2798 (1999), 80013-4651(98)02-016-5 CCC: $7.00 © The Electrochemical Society, Inc.

Mayers, et al., Suppression of Dendrite Formation via Pulse Charging in Rechargeable Lithium Metal Batteries, The Journal of Physical Chemistry, dx.doi.org/10.1021/jp309321w | J. Phys. Chem. C 2012, 116, 26214-26221.

* cited by examiner

SYSTEMS AND METHODS FOR FAST CHARGING BATTERIES USING INTERMITTENT DISCHARGE PULSES

TECHNICAL FIELD

This disclosure relates to charging systems and methods for fast charging battery cells using intermittent discharge pulses.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A battery pack typically powers the electric machines and other electrical loads of the electrified vehicle. The battery pack includes a plurality of battery cells that must be periodically recharged to replenish the energy necessary to power these loads. Batteries designed for high energy density require relatively long charging times to achieve full capacity when starting from a relatively low state of charge.

SUMMARY

A method according to an exemplary aspect of the present disclosure includes, among other things, applying a discharge pulse current to a battery cell for a first time period, after applying the discharge pulse current for the first time period, applying a charging current to the battery cell for a second time period that is longer than the first time period, and repetitively alternating between applying the discharge pulse current and the charging current until the battery cell reaches a predefined maximum voltage.

In a further non-limiting embodiment of the foregoing method, the discharge pulse current and the charging current are equivalent currents.

In a further non-limiting embodiment of either of the foregoing methods, the discharge pulse current and the charging current are different currents.

In a further non-limiting embodiment of any of the foregoing methods, the discharge pulse current and the charging current are applied at C-rates of between 1C and 20C.

In a further non-limiting embodiment of any of the foregoing methods, the first time period is between 0 seconds and 30 seconds, and the second time period is between 2 minutes and 30 minutes.

In a further non-limiting embodiment of any of the foregoing methods, the first time period is between 500 milliseconds and 30 seconds, and the second time period is between 2 minutes and 10 minutes.

In a further non-limiting embodiment of any of the foregoing methods, a relationship between the first time period and the second time period may be represented by the following equation:

$$0.25*T2 >= T1 >= 0.000278*T2.$$

In a further non-limiting embodiment of any of the foregoing methods, the method is part of an AC or DC fast charging method.

In a further non-limiting embodiment of any of the foregoing methods, the method includes periodically comparing a voltage of the battery cell to the predefined maximum voltage.

In a further non-limiting embodiment of any of the foregoing methods, the battery cell is a lithium-ion battery cell.

A charging system according to another exemplary aspect of the present disclosure includes, among other things, a charging circuit including a battery cell and a control system configured to control the charging circuit during a charging event. The control system is configured to command the charging circuit to apply a discharge pulse current to the battery cell for a first time period, apply a charging current to the battery cell for a second time period that is longer than the first time period, and repetitively alternate between applying the discharge pulse current and the charging current until the battery cell reaches a predefined maximum voltage.

In a further non-limiting embodiment of the foregoing charging system, the charging event is an AC or DC fast charging event.

In a further non-limiting embodiment of either of the foregoing charging systems, the charging circuit includes a switch and a resistive device or any other load device.

In a further non-limiting embodiment of any of the foregoing charging systems, the resistive device is a resistor.

In a further non-limiting embodiment of any of the foregoing charging systems, the control system is configured to command the switch to an open position to apply the discharge pulse current and to a closed position to apply the charging current.

In a further non-limiting embodiment of any of the foregoing charging systems, the control system includes a plurality of control modules that communicate with one another to control the charging of the battery cell.

In a further non-limiting embodiment of any of the foregoing charging systems, the plurality of control modules include a battery electric control module (BECM), an off-board charge control module, and a battery charge control module (BCCM).

In a further non-limiting embodiment of any of the foregoing charging systems, the discharge pulse current and the charging current are equivalent currents.

In a further non-limiting embodiment of any of the foregoing charging systems, the discharge pulse current and the charging current are different currents.

In a further non-limiting embodiment of any of the foregoing charging systems, the first time period is between 0 seconds and 30 seconds, and the second time period is between 2 minutes and 30 minutes.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes exemplary charging systems and methods for fast charging energy storage devices (e.g., battery cells of battery packs). An exemplary charging system may be configured to control charging of a charging circuit by employing repetitive intermittent discharge pulses. The control system may be configured to command the charging circuit to apply a discharge pulse current to the battery cell for a first time period, apply a fast charging current to the battery cell for a second time period that is significantly longer than the first time period, and then repetitively alternate between applying the discharge pulse current and the fast charging current until the battery cell reaches a predefined maximum voltage. These and other features are discussed in greater detail in the following paragraphs of this detailed description.

Figure 1:
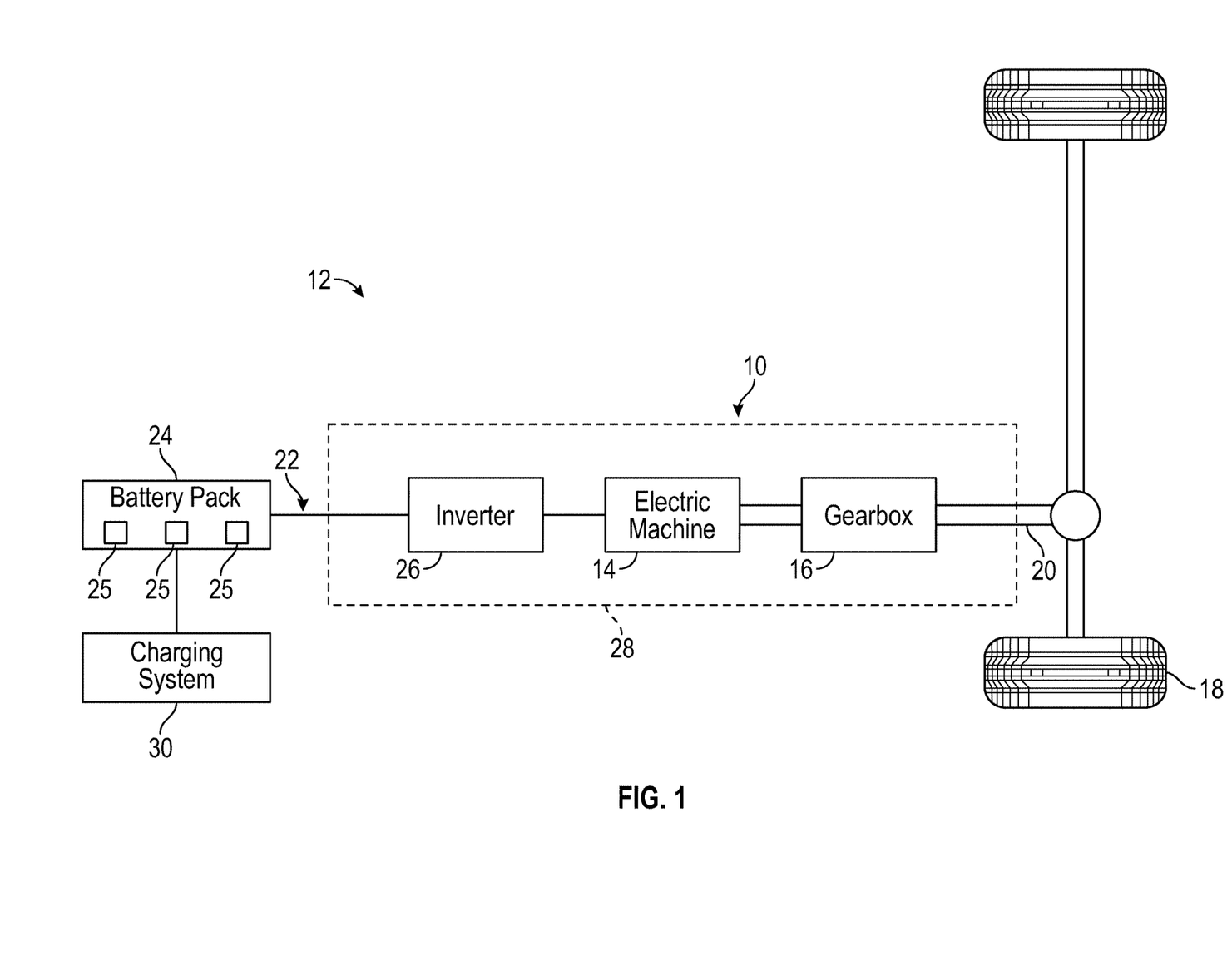
FIG. 1 schematically illustrates a powertrain of an electrified vehicle.

FIG. 1 schematically illustrates a powertrain 10 of an electrified vehicle 12. The electrified vehicle 12 may be a battery electric vehicle (BEV) or a plug-in hybrid electric vehicle (PHEV), for example. Therefore, although not shown in the exemplary embodiment, the electrified vehicle 12 could be equipped with an internal combustion engine that can be employed either alone or in combination with other energy sources to propel the electrified vehicle 12.

In an embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20.

A voltage bus 22 may electrically connect the electric machine 14 to a battery pack 24 through an inverter 26. The electric machine 14, the gearbox 16, and the inverter 26 may be collectively referred to as a transmission 28 of the electrified vehicle 12.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12. In an embodiment, each battery array 25 of the battery pack 24 includes a plurality of pouch style, lithium-ion cells. However, battery cells having other geometries (cylindrical, prismatic, etc.), other chemistries (nickel-metal hydride, lead-acid, etc.), or both could alternatively be utilized within the scope of this disclosure.

The electrified vehicle 12 is also be equipped with a charging system 30 for charging the battery cells contained within the battery pack 24. As described in greater detail below, the charging system 30 may include charging components that are located both onboard the electrified vehicle 12 and external to the electrified vehicle 12. The charging system 30 can be connected to an external power source for receiving and distributing power throughout the electrified vehicle 12.

The powertrain 10 of FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle, including but not limited to cars, trucks, sport utility vehicles, boats, planes, etc.

Figure 2:
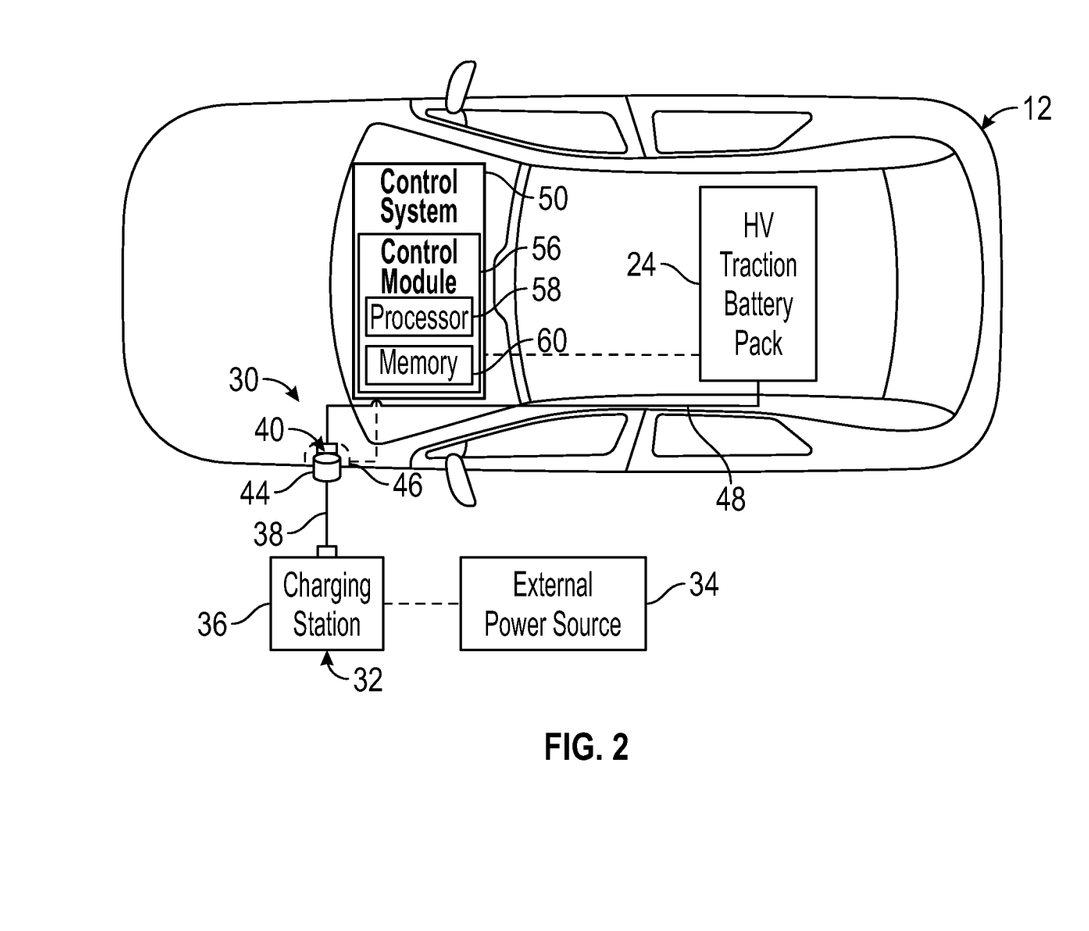
FIG. 2 schematically illustrates an exemplary charging system for controlling charging of a battery pack of an electrified vehicle.

FIG. 2 schematically illustrates an electrified vehicle 12 parked near a charging station 32 for charging. The electrified vehicle 12 may employ the powertrain 10 shown in FIG. 1 or any similar electrified powertrain. The electrified vehicle 12 is equipped with a charging system 30 for charging the battery pack 24, or more particularly, for charging the battery cells of the battery pack 24. As described in greater detail below, the charging system 30 is configured to employ a fast charging method that utilizes repetitive intermittent discharge pulses for fast charging the battery cells of the battery pack 24.

The charging station 32 is powered by an external power source 34 (shown schematically). In an embodiment, the external power source 34 includes utility grid power. In another embodiment, the external power source 34 includes an alternative energy source, such as solar power, wind power, etc. In yet another embodiment, the external power source 34 includes a combination of utility grid power and alternative energy sources.

The charging station 32 may include, among other things, a housing 36 and a charge cord 38. In general, the housing 36 houses the various internal components of the charging station 32. The size, shape, and configuration of the housing 36 is not intended to limit this disclosure. The housing 36 may additionally include one or more output displays (not shown) for displaying information to a user of the electrified vehicle 12.

The charge cord 38 may extend outside of the housing 36 for connection to the electrified vehicle 12. The charge cord 38 may include a charge connector 44 that is configured to connect to a vehicle inlet assembly 46 of the electrified vehicle 12. The charge cord 38 could either be integrally connected to the charging station 32 or could be part of electric vehicle supply equipment (EVSE) that is both connectable and detachable relative to each of the vehicle inlet assembly 46 and the charging station 32.

The vehicle inlet assembly 46 may include a plurality of ports 40 that each include a mating terminal for carrying current during charging events. Power originating from the external power source 34 may be transferred from the charging station 32 to the vehicle inlet assembly 46 for charging the battery pack 24 of the electrified vehicle 12 via the charge connector 44 that is attached to the charge cord 38. One or more high voltage cables 48 may connect between the vehicle inlet assembly 46 and the battery pack 24 for transferring the power received by the vehicle inlet assembly 46 to the battery pack 24 for replenishing the energy of the battery cells of the battery pack 24.

The charging system 30 of the electrified vehicle 12 may include a multitude of components that function together to control charging of the electrified vehicle 12. In an embodiment, the charging system 30 includes the charge cord 38, the charge connector 44, the vehicle inlet assembly 46, the high voltage cable 48, and the battery pack 24. Thus, the charging system 30 may include components that are located both onboard and offboard the electrified vehicle 12.

The charging system 30 may be configured to deliver power to the battery pack 24 using any type of charging (e.g., AC, DC, etc.). In an embodiment, the charging system 30 is a DC fast charging system configured for performing direct current (DC) fast charging events. DC fast charging events are relatively immediate, rapid charge events with durations of approximately 15 to 90 minutes. The charging system 30 may employ DC fast charging by delivering power levels of 50 kW or more to rapidly charge the battery cells of the battery pack 24, as opposed to the power output of standard alternating current chargers, by way of one non-limiting example. The DC fast charging events may involve digital communications between the charging system 30 and the charging station 32 and are capable of delivering DC power to the battery pack 24 without the need to perform any AC/DC conversions. AC fast charging events are also contemplated within the scope of this disclosure.

Although effective at reducing charging times, fast charging has not found universal acceptance at least in part because the relatively high power levels utilized during these events can cause lithium plating, self-heating, impedance increases, greater degrees of cell imbalance, and battery cell life reductions, etc. With these high rate charging processes, limits due to ionic transfer rate (concentration polarization) may be exceeded, which may result in lithium deposition on the anode surface of the battery cell or other degradation effects. These effects may limit intercalation of lithium ions into the interplanes of the graphite anode, and may lead to increased interface layer growth at the anode surface. Adding discharge pulses during high rate charging may counteract the polarization effect for better ion insertion into the graphite layer, and therefore less impedance growth and/or reduced capacity loss. The charging system 30 and associated methods of this disclosure are therefore adapted to employ an improved fast charging protocol for facilitating an improved battery cell cycle life, as well as other potential benefits.

Figure 3:
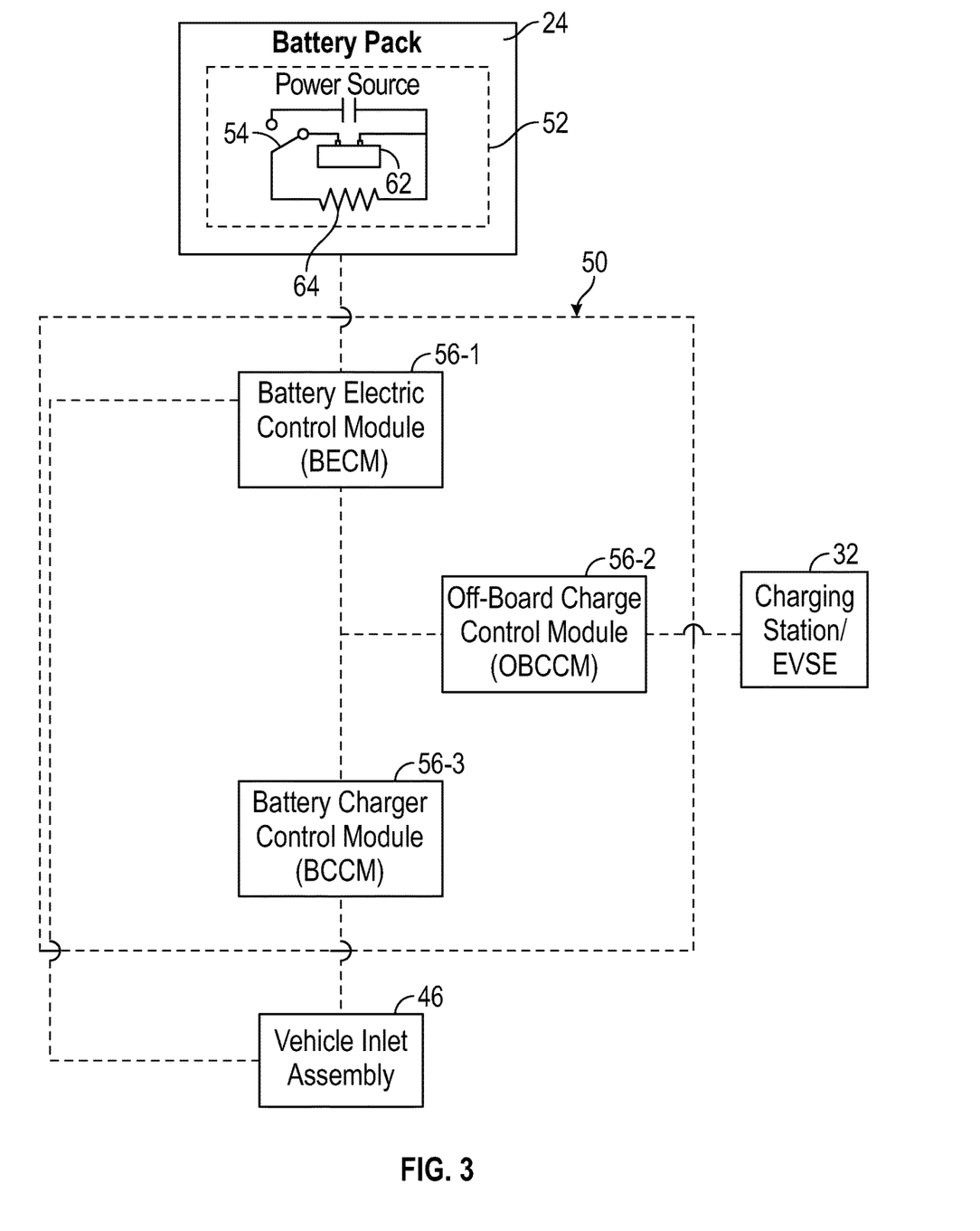
FIG. 3 is a block diagram illustrating an exemplary control system of the charging system of FIG. 2.
Figure 5:
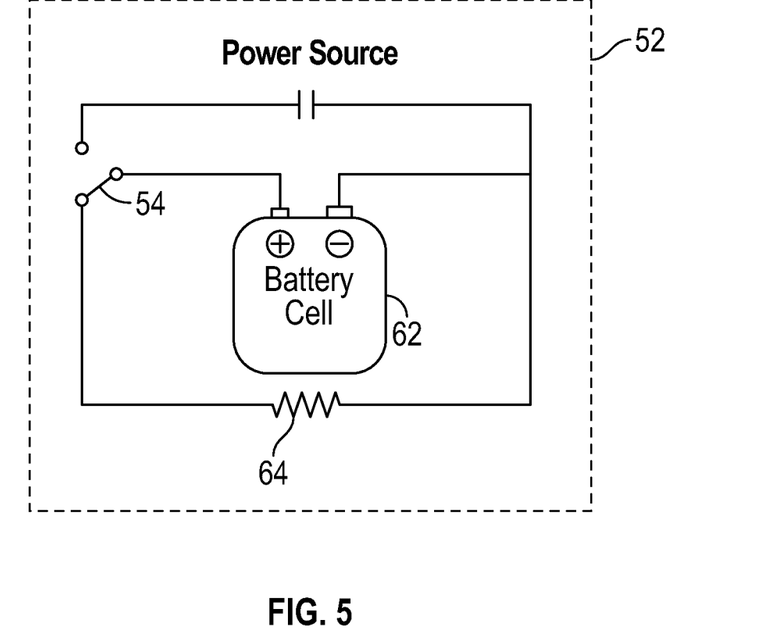
FIG. 5 schematically illustrates a charging circuit of the charging system of FIG. 2 during pulse discharging of a battery cell.
Figure 6:
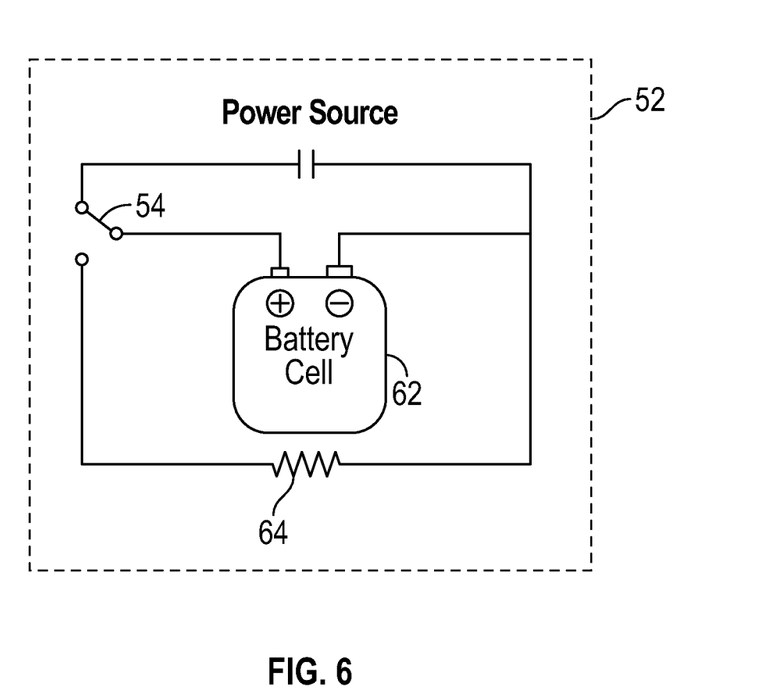
FIG. 6 schematically illustrates the charging circuit of FIG. 4 during fast charging of the battery cell.

Referring now primarily to FIGS. 2-3, the charging system 30 of the electrified vehicle 12 may additionally include a control system 50 and a charging circuit 52 (see FIGS. 3 and 5-6). The control system 50 is configured to control charging of the electrified vehicle 12 once connected to the charging station 32. The control system 50 may be part of an overall vehicle control system or could be a separate control system that communicates with the vehicle control system. The control system 50 may include one or more control modules 56 equipped with executable instructions for interfacing with and commanding operation of various components of the charging system 30. Each control module 56 of the control system 50 may include a processing unit 58 and non-transitory memory 60 for executing the various control strategies and protocols of the charging system 30, including but not limited to a method for fast charging the battery pack 24 using repetitive intermittent discharge pulses.

In an embodiment, as schematically shown in FIG. 3, the control system 50 may include each of a battery electric control module (BECM) 56-1 (i.e., a first control module), an off-board charge control module (OBCCM) 56-2 (i.e., a second control module), and a battery charge control module (BCCM) 56-3 (i.e., a third control module). The control modules 56-1, 56-2, and 56-3 are capable of communicating with one another to control charging of the battery pack 24. The total number of control modules employed by the control system 50 is not intended to limit this disclosure, and other control system configurations than the one shown in FIG. 3 are further contemplated within the scope of this disclosure.

The BECM 56-1 may be configured, among other things, to control the flow of energy between the vehicle inlet assembly 46 and the battery pack 24. For example, the BECM 56-1 may be configured to monitor and manage the temperature and state of charge of each of battery cell of the battery pack 24. In an embodiment, the BECM 56-1 may command the opening or closing of one or more switches 54 of the charging circuit 52 for controlling the flow of energy to the battery cells of the battery pack 24.

The OBCCM 56-2 may be configured, among other things, to communicate with and control operation of the charging station 32. This may include, for example, communicating with and controlling various off-board charging components such as the charge cord 38 or some other EVSE.

The BCCM 56-3 may communicate with the BECM 56-1. For example, the BCCM 56-3 may send a signal to the BECM 56-1 indicative of a DC fast charging event, such as when the connector 44 of the charge cord 38 is plugged into the vehicle inlet assembly 46. In response to the signal, the BECM 56-1 may command the opening or closing of the switches 54, thereby allowing the transfer of electric energy between the vehicle inlet assembly 46 and the battery pack 24 during charging events.

In an embodiment, the charging circuit 52 is disposed inside the battery pack 24. However, other locations are also contemplated within the scope of this disclosure, such as inside the charge connector 44 or inside the charging station 32. The charging circuit 52 is intended to illustrate a non-limiting example of a simplified circuit that could be employed for performing the repetitive intermittent discharge pulsing strategies of this disclosure. Other circuit configurations may also be suitable and are contemplated within the scope of this disclosure.

The exemplary charging circuit 52 may include one or more battery cells 62, one or more switches 54, and one or more resistive devices 64 (e.g., a resistor or other load device for the purpose of discharging the battery cells 62). The switch 54 may be controlled by the control system 50 for controlling the charging/discharging of the battery cell 62 during charging events. The switch 54 can be selectively actuated between a closed position (see FIG. 6) and an open position (see FIGS. 3 and 5). In the closed position, current from the power source is permitted to flow to the battery cell 62 for charging (i.e., increasing the voltage) of the battery cell 62. In the open position, the current from the power source is forced to flow through the resistive device 64, thereby applying a resistive load across the battery cell 62. Applying the resistive load effectively discharges (i.e., reduces the voltage) of the battery cell 62.

Figure 4:
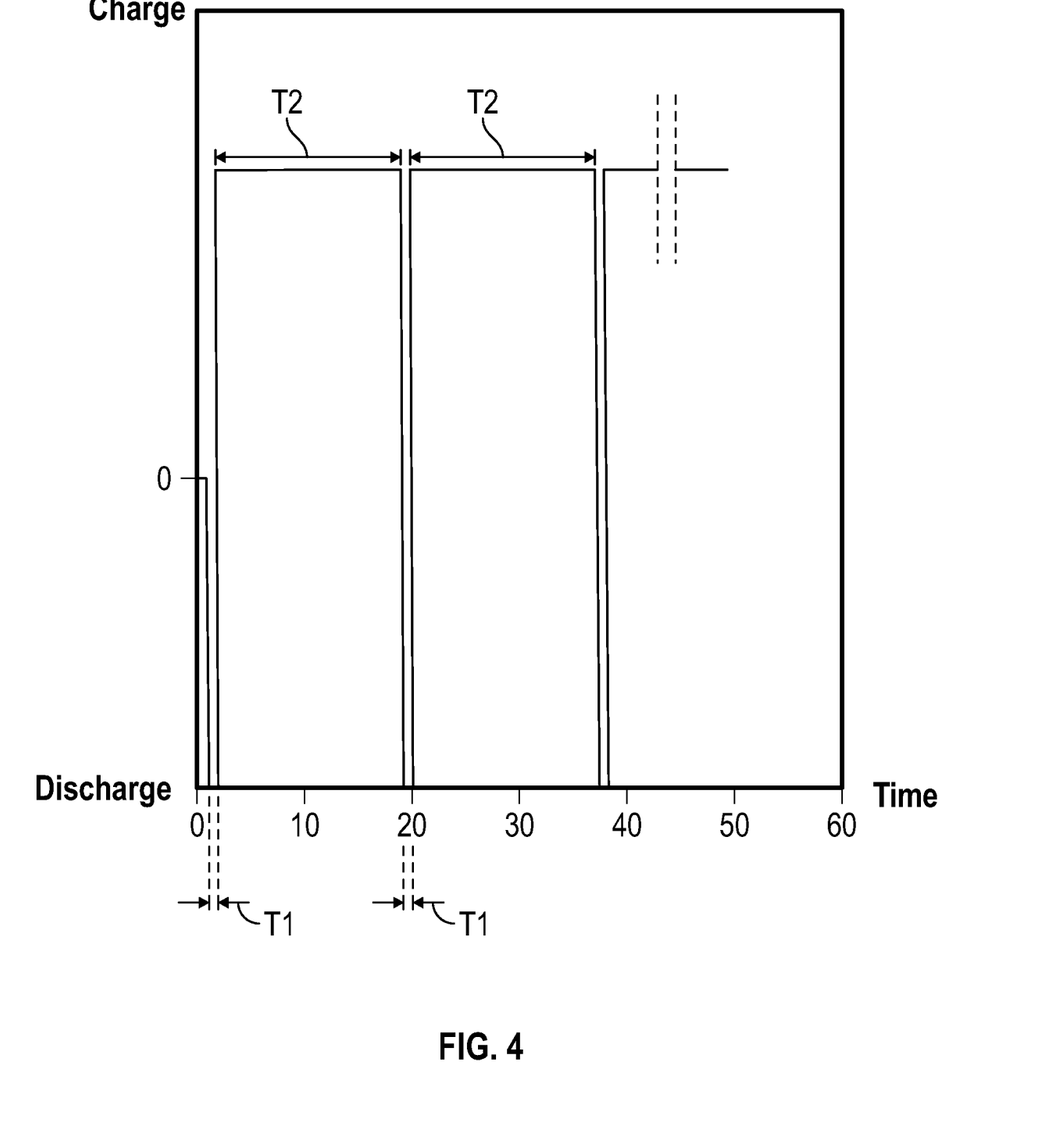
FIG. 4 graphically illustrates a fast charging method according to an exemplary embodiment of this disclosure.

Referring now to FIGS. 2-4, the control system 50 may be configured to control the charging circuit 52 to employ repetitive intermittent discharge pulses during fast charging events. Applying short term intermittent discharge pulses during high rate charging may counteract polarization effects for better ion insertion into the graphite layer of the cell, thereby resulting in less impedance growth and/or capacity loss, among other benefits.

In an embodiment, the control system 50 may first command the switch 54 to the open position (see FIG. 5) in order to force the current from the power source to flow through the resistive device 64. This results in applying a relatively short, high rate discharge pulse current to the battery cell 62. The discharge pulse current slightly discharges the battery cell 62. The discharge pulse current may be applied for a first time period T1 (see FIG. 4). In an embodiment, the first time period T1 is between 0 and 30 seconds in length. In another embodiment, the first time period T1 is between 500 milliseconds and 30 seconds.

Subsequent to applying the discharge pulse current, the control system 50 may next command the switch 54 to the closed position (see FIG. 6) in order to apply a relatively high rate charging current to the battery cell 62. The high rate charging current increases the charge of the battery cell 62. The charging current may be applied for a second time period T2 (see FIG. 4). In an embodiment, the second time period T2 is significantly longer than the first time period T1 and may be between 2 minutes and 30 minutes in length. In another embodiment, the second time period T2 is between 2 minutes and 10 minutes in length. The relationship between the first time period T1 and the second time period T2 may be represented by the following equation 1:

$$0.25*T2 >= T1 >= 0.000278*T2 \qquad (1)$$

The charging current applied during the charging step may be set at any current that is typically used during fast charging events. The currents applied during the discharging step and the charging step may be either the same or different currents. In an embodiment, the C-rate of the charging current applied during the charging and discharging steps may be between 1C and 20C. The discharge pulse current and the charge current may be any combination of currents from this range.

The discharging step and the charging step described above may be repeated by repetitively alternating between applying the discharge pulse current for the first time period T1 followed by applying the charging current for the second time period T2. This alternating pattern of applying the discharging pulse current followed by the charging current may be performed until the voltage of the battery cell 62 reaches a predefined maximum voltage.

Figure 7:
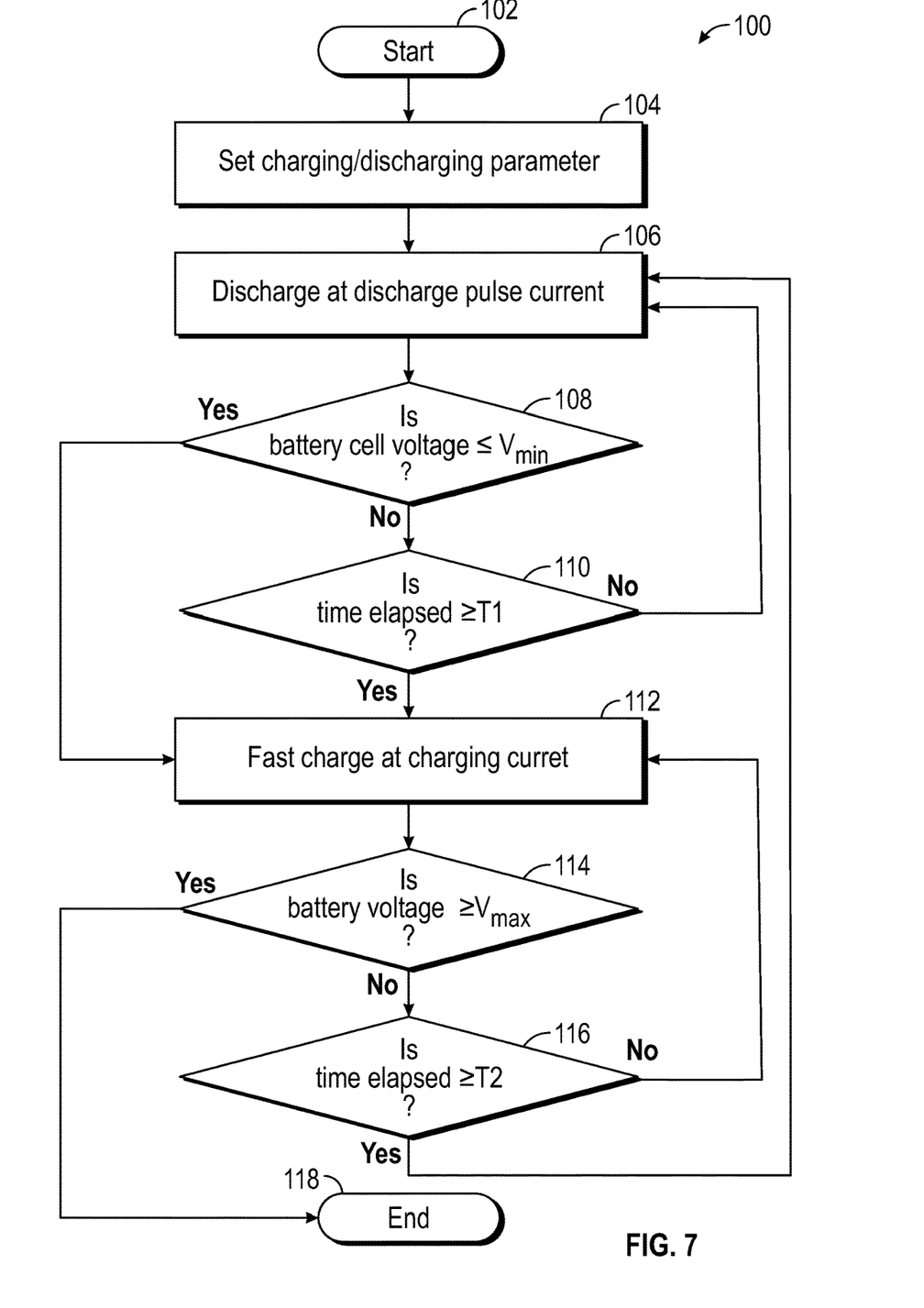
FIG. 7 is a flow chart schematically illustrating a method for fast charging a battery cell of an electrified vehicle.

FIG. 7, with continued reference to FIGS. 1-6, schematically illustrates a method 100 for controlling charging of the battery cells 62 of the battery pack 24 of the electrified vehicle 12. In an embodiment, the control system 50 is programmed with one or more algorithms adapted to execute the exemplary method 100. Among other things, the method 100 may improve the fast charging performance and cycle life of the battery cells 62 by employing repetitive intermittent discharge pulses during fast charging events.

The exemplary method 100 may begin at block 102. At block 104, the charging and discharging parameters of the charging method 100 may be set. The charging/discharging parameters may include, but are not limited to, the discharge pulse current, the first time period T1 for applying the discharge pulse current, a predefined minimum voltage of the battery cell 62, the charging current, the second time period T2 for applying the charging current, and the predefined maximum voltage of the battery cell 62. These parameters may all be predefined values that are stored in the memory 60 of the control module(s) 56 control system 50, such as in one or more look-up tables, for example.

Next, at block 106, the discharge pulse current is applied to the battery cell 62. The control system 50 may command the switch 54 to the open position in order to apply a resistive load across the battery cell 62 and thus discharge the voltage of the battery cell 62 via the discharge pulse current.

The control system 50 may next confirm whether the voltage of the battery cell 62 is less than or equal to the predefined minimum voltage at block 108 and whether the time elapsed since applying the discharge pulse current is greater than or equal to the first time period T1 at block 110. If block 108 returns a YES flag, or if block 110 returns a YES flag, the method 100 may proceed to block 112.

At block 112, the charging current is applied to the battery cell 62. The control system 50 may command the switch 54 to the closed position in order to allow the charging current to increase the voltage of the battery cell 62.

The control system 50 may next confirm whether the voltage of the battery cell 62 is greater than or equal to the predefined maximum voltage at block 114 and whether the time elapsed since applying the charging current is greater than or equal to the second time period T2 at block 116. If block 116 returns a No flag, the charging continues. If block 116 returns a Yes flag, the method 100 goes to block 106 and begins the discharge pulsing. If block 114 returns a YES flag, or if blocks 114 and 116 both return NO flags, the method 100 may end at block 118 (in this case, charging will continue).

Examples

Example 1: Fast Charging Cycle

Figure 8A:
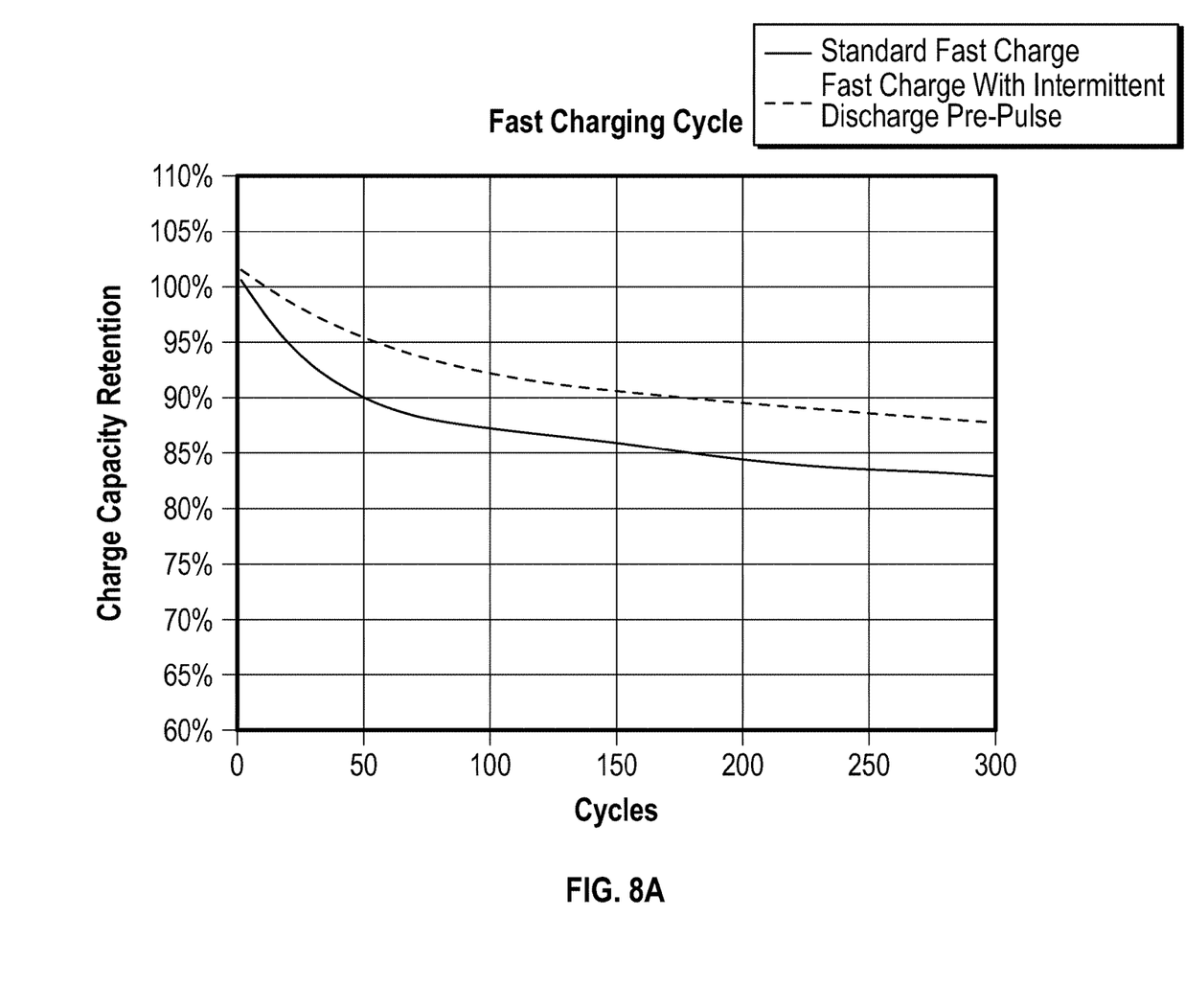
FIGS. 8A and 8B graphically illustrate a performance comparison of a battery cell that is fast charged using the fast charging method according to an exemplary embodiment of this disclosure (e.g., with intermittent discharge pulses) and a conventional fast charging method (e.g., without intermittent discharge pulses).

The method 100 of FIG. 7 was tested against a standard fast charge method (i.e., one that does not involve intermittent discharge pulsing) using a lithium-ion battery cell. The charging capacity of the battery cell was measured over multiple load cycles for each charging method. The results are shown in the plots of FIG. 8A, which illustrate an increased charging capacity retention by using the method 100.

Example 2: Coulombic Efficiency of the Fast Charging Cycle

Figure 8B:
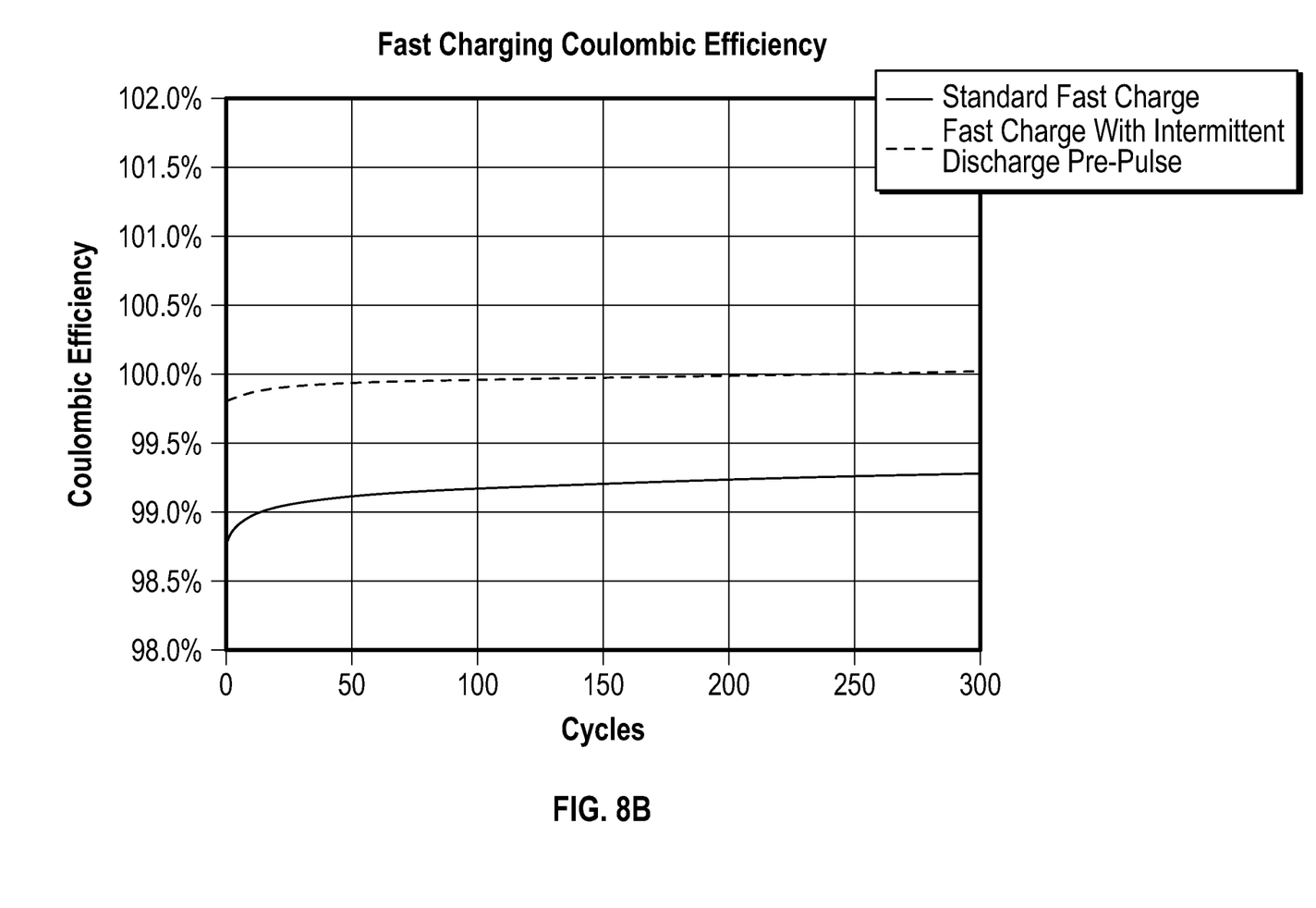

Coulombic efficiency of a lithium-ion battery cell was measured over multiple load cycles for the charging method of this disclosure versus standard fast charge methods. The results of this efficiency testing are shown in the plots of FIG. 8B, which illustrate a higher Coulombic efficiency by using the method 100.

The exemplary charging systems and methods described herein are configured to employ a fast charging method that utilizes intermittent discharge pulses during high rate charging and may be utilized to improve fast charging of any battery cell for any application. The periodic usage of discharge pulses may counteract polarization effects, thereby decreasing impedance growth and/or capacity loss. Further charging benefits may include higher energy throughput and miles per charge, increased battery capacity retention over cycle life, and increased charging efficiency over cycle life.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
applying a discharge pulse current to a battery cell for a first time period;
after applying the discharge pulse current for the first time period, applying a charging current to the battery cell for a second time period that is longer than the first time period; and
repetitively alternating between applying the discharge pulse current and the charging current until the battery cell reaches a predefined maximum voltage,
wherein the method is part of a DC fast charging method in which power levels of at least 50 kW are delivered for rapidly charging the battery cell.

2. The method as recited in claim 1, wherein the discharge pulse current and the charging current are equivalent currents.

3. The method as recited in claim 1, wherein the discharge pulse current and the charging current are different currents.

4. The method as recited in claim 1, wherein the discharge pulse current and the charging current are applied at C-rates of between 1C and 20C.

5. The method as recited in claim 1, wherein the first time period is between 0 seconds and 30 seconds, and the second time period is between 2 minutes and 30 minutes.

6. The method as recited in claim 1, wherein the first time period is between 500 milliseconds and 30 seconds, and the second time period is between 2 minutes and 10 minutes.

7. The method as recited in claim 1, wherein a relationship between the first time period and the second time period is represented by the following equation:
$0.25*T2 >= T1 >= 0.000278*T2$.

8. The method as recited in claim 1, comprising periodically comparing a voltage of the battery cell to the predefined maximum voltage.

9. The method as recited in claim 1, wherein the battery cell is a lithium-ion battery cell.

10. The method as recited in claim 1, wherein the method produces a Coulombic efficiency of about 100.0% over multiple load cycles of the battery cell.

11. A charging system, comprising:
a charging circuit including a battery cell; and
a control system configured to control the charging circuit during a DC fast charging event,
wherein the DC fast charging event is a charging event in which power levels of at least 50 kW are delivered for rapidly charging the battery cell,
wherein the control system is configured to command the charging circuit to:
apply a discharge pulse current to the battery cell for a first time period;
apply a charging current to the battery cell for a second time period that is longer than the first time period; and
repetitively alternate between applying the discharge pulse current and the charging current until the battery cell reaches a predefined maximum voltage.

12. The charging system as recited in claim 11, wherein the charging circuit includes a switch and a resistive device.

13. The charging system as recited in claim 12, wherein the resistive device is a resistor.

14. The charging system as recited in claim 12, wherein the control system is configured to command the switch to an open position to apply the discharge pulse current and to a closed position to apply the charging current.

15. The charging system as recited in claim 11, wherein the control system includes a plurality of control modules that communicate with one another to control the charging of the battery cell.

16. The charging system as recited in claim 15, wherein the plurality of control modules include a battery electric control module (BECM), an off-board charge control module, and a battery charge control module (BCCM).

17. The charging system as recited in claim 11, wherein the discharge pulse current and the charging current are equivalent currents.

18. The charging system as recited in claim 11, wherein the discharge pulse current and the charging current are different currents.

19. The charging system as recited in claim 11, wherein the first time period is between 0 seconds and 30 seconds, and the second time period is between 2 minutes and 30 minutes.

20. A method, comprising:
applying a discharge pulse current to a battery cell for a first time period;
after applying the discharge pulse current for the first time period, applying a charging current to the battery cell for a second time period that is longer than the first time period; and
repetitively alternating between applying the discharge pulse current and the charging current until the battery cell reaches a predefined maximum voltage,
wherein the first time period is between 500 milliseconds and 30 seconds, and the second time period is between 2 minutes and 30 minutes,
wherein a relationship between the first time period and the second time period is represented by the equation $0.25*T2 >= T1 >= 0.000278*T2$,
wherein the method is part of a DC fast charging method in which power levels of at least 50 kW are delivered for rapidly charging the battery cell.

* * * * *